US008261202B2

(12) United States Patent
Dunn

(10) Patent No.: US 8,261,202 B2
(45) Date of Patent: Sep. 4, 2012

(54) SYSTEMS AND METHODS FOR PROVIDING A COMMON TIME MANIPULATION SERVICE TO DESKTOP APPLICATIONS

(75) Inventor: Arthur Dunn, Hamilton Hill (AU)

(73) Assignee: Honeywell International Inc., Morristown, NJ (US)

( * ) Notice: Subject to any disclaimer, the term of this patent is extended or adjusted under 35 U.S.C. 154(b) by 1105 days.

(21) Appl. No.: 12/145,981

(22) Filed: Jun. 25, 2008

(65) Prior Publication Data

US 2009/0327933 A1   Dec. 31, 2009

(51) Int. Cl.
*G06F 3/48* (2006.01)
(52) U.S. Cl. .......... 715/764; 700/88; 707/668; 715/200; 715/700
(58) Field of Classification Search .................. 715/200, 715/700; 700/88; 707/668
See application file for complete search history.

(56) References Cited

U.S. PATENT DOCUMENTS

| 7,299,405 B1 * | 11/2007 | Lee et al. .................. 715/700 |
| 7,627,808 B2 * | 12/2009 | Blank et al. ................ 715/200 |
| 7,853,569 B2 * | 12/2010 | Mukhi et al. ................ 707/668 |
| 2002/0129291 A1 | 9/2002 | Gonzalez |
| 2003/0171898 A1 | 9/2003 | Tarassenko et al. |
| 2004/0250108 A1 | 12/2004 | Parsons et al. |
| 2005/0144532 A1 | 6/2005 | Dombrowa et al. |
| 2006/0115072 A1 | 6/2006 | Kessinger et al. |
| 2008/0294275 A1 * | 11/2008 | Reichard et al. ................ 700/88 |

* cited by examiner

*Primary Examiner* — Ryan Pitaro
*Assistant Examiner* — Tuan S Nguyen
(74) *Attorney, Agent, or Firm* — Jetter & Associates, P.A.

(57) ABSTRACT

A method (700) for providing master time control (MTC) services to historian applications (HAs). Each HA (414₂, ..., 414ₙ) is configured to display content (560, 562) having a time of focus and a local time control (LTC) user interface (532) when in an LTC mode. The method involves changing a time control mode (TCM) of a first and second HA from the LTC mode to an MTC mode. The method also involves synchronizing times of focus for the first and second HAs to an MTC time of focus. This synchronization is performed in response to the TCM changes. The method further involves displaying first and second content. Each content includes time-stamped historical data (210) obtained during a period of elapsed time defined by the time of focus for said respective first or second HA.

15 Claims, 10 Drawing Sheets

Time Control Properties User Interface 600

| Field | Value | Absolute | Relative |
|---|---|---|---|
| Time Period: | 2 Hours | | |
| From (start time): | Now - 2 Hours | ○ Absolute | ● Relative |
| To (end time): | Now | ○ Absolute | ● Relative |
| Current Time: | | ○ Absolute | ● Relative |
| Refresh Time Interval: | 1 Minute | | |
| Fast Replay: | 2 Times Normal | | |
| Small Step: | 1 Minute | | |
| Large Step: | 5 Minutes | | |

[ OK ]   [ Cancel ]

FIG. 6

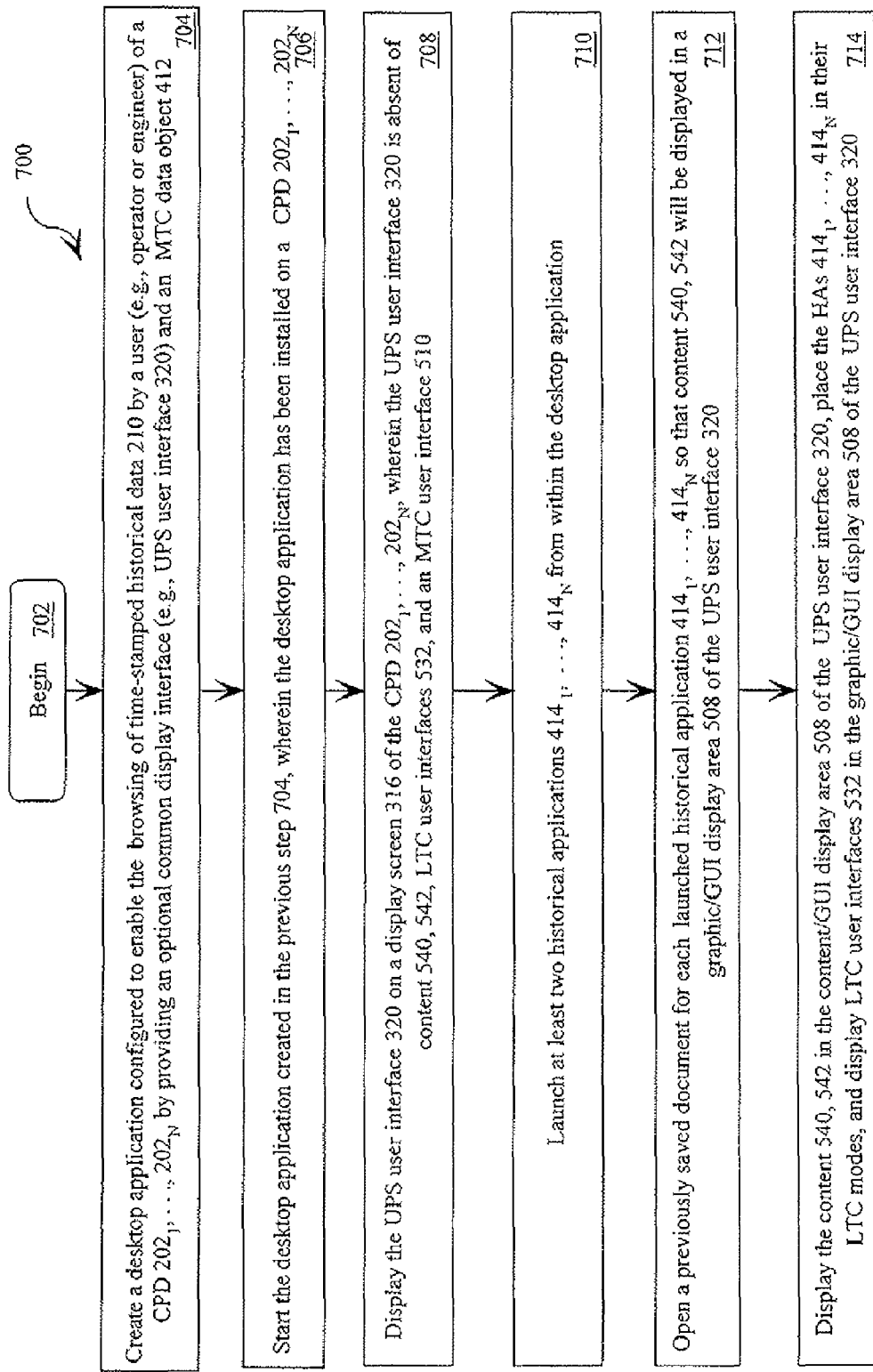

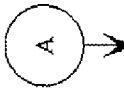

From FIG. 7A

Change the modes of the at least two historical applications $414_1, \ldots, 414_N$ from LTC modes to MTC modes    716

Hide the LTC user interfaces 532 for each of the displayed graphics 540, 542 and display an MTC user interface 510 in the UPS user interface 320, wherein the MTC user interface 510 facilitates user-software interactions for performing MTC operations to concurrently control and/or manipulate timing features, timing parameters, and times of focuses for the displayed content 540, 542    718

Refresh the data for the displayed content 540, 542 according to the pre-defined MTC timing parameters so that each displayed content 540, 542 has the same time of focus    720

Simultaneously move the time of focuses for the displayed content 540, 542 backwards (or forwards) by a small step in time (e.g., 5 minutes) by performing a user action generally involving clicking a small step backwards button 514 (or a small step forwards button 518) of the MTC user interface 510 and performing software operations (in response to the user action) for stepping time backwards (or forwards), wherein the software operations are implemented by at least the MTC data object 412    722

Simultaneously move the time of focuses for the displayed content 540, 542 backwards (or forwards) by a large step in time (e.g., 15 minutes) by performing a user action generally involving clicking a large step backwards button 512 (or a large step forwards button 520) of the MTC user interface 510 and performing software operations (in response to the user action) for stepping time backwards (or forwards), wherein the software operations are implemented by at least the MTC data object 412.    724

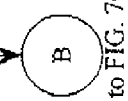

From FIG. 7B

Simultaneously refresh the data for the displayed content 540, 542 according to the pre-defined MTC timing parameters by performing a user action generally involving clicking a refresh button 522 of the MTC user interface 510 and performing software operations (in response to the user action) for refreshing the data of the displayed content 540, 542, wherein the software operations are implemented at least by the MTC data object 412.   726

Change at least one timing parameter by performing user/software actions generally involving clicking a parameter button 526 of the MTC user interface 510, displaying a time control parameter (TCP) user interface 600 in the UPS user interface 320, selecting a new value for at least one MTC timing parameter using at least one widget of the TCP user interface 600, clicking an "OK" button of the TCP user interface 600, and storing the new value(s) in a memory 308 of the CPD $202_1, 202_i, \ldots, 202_N$.   728

Refresh the data for the displayed content 540, 542 according to the new MTC timing parameter values   730

Activate the hairlines 596 and display the hairline 596 in each displayed trend content 542   732

Simultaneously move the hairlines 596 by performing a user action generally involving moving a sliding bar 516, and performing software operations (in response to the user action) for moving the hairlines 596, wherein the software operations are implemented at least by the MTC data object 412.   734

Go to FIG. 7D

FIG. 7C

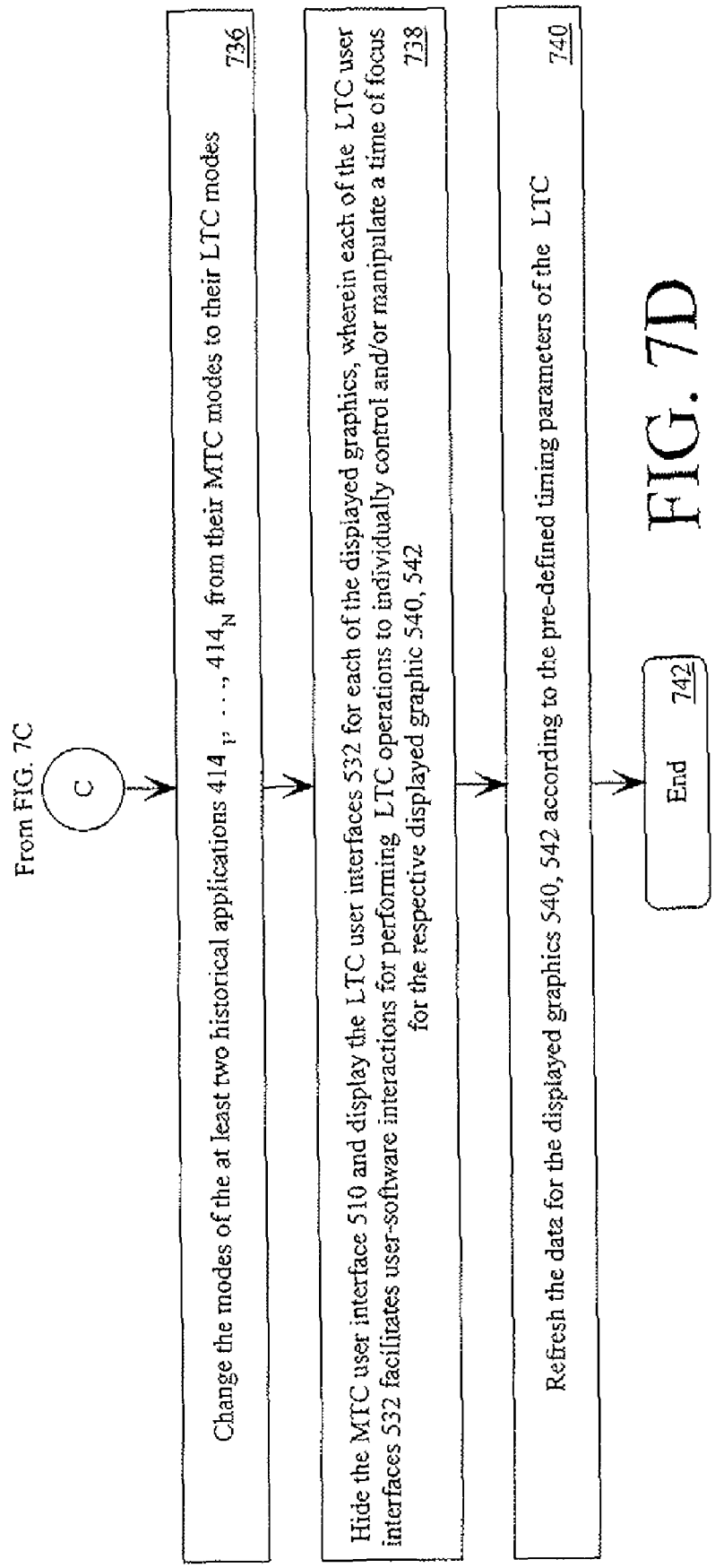

SYSTEMS AND METHODS FOR PROVIDING A COMMON TIME MANIPULATION SERVICE TO DESKTOP APPLICATIONS

BACKGROUND OF THE INVENTION

1. Statement of the Technical Field

The invention concerns computer systems. More particularly, the invention concerns systems and methods for providing a common (or a master) time manipulation service to desktop applications (e.g., historian applications).

2. Background

There are many conventional systems known in the art for facilitating access to time-stamped historical data. One such conventional system comprises an operator computer system (OCS), a plant control system (PCS), and industrial equipment. The PCS generally has a distributed network configuration, i.e., there are application specific modules connected to each other, industrial equipment, and operator interfaces via a local control network. The PCS is often comprised of a server and database for storing time-stamped historical data. The time-stamped historical data generally includes information defining the operations of the industrial equipment. For example, if the industrial equipment is a tank, then the time-stamped historical data includes information defining a liquid level in the tank at pre-selected times. Notably, the time-stamped historical data may not be written to a storage device at the pre-selected times. In such a scenario, the time-stamped historical data can be stored in a storage device at regular intervals, on-demand, or on an event. The tank level values and associated time-stamp values are periodically communicated from the industrial equipment to the PCS for storage in the database. The tank level and time-stamp values can be written to a storage device at regular intervals, on-demand, or at the time of an event.

The OCS is configured to enable the control of the industrial equipment by a user (e.g., an operator, a technician, or an engineer) and to facilitate the browsing of time-stamped historical data by the user. It should be understood that the user may need to browse time-stamped historical data for purposes of analyzing the operations of the industrial equipment. For example, if a user wants to determine if a level of a tank is increasing over time, then the user can browse the time-stamped historical data for the tank level over a certain period of time using historian applications installed on the OCS. Historian applications are well known to those having ordinary skill in the art, and therefore will not be described in detail herein. However, it should be understood that the historian applications can be configured to display graphical user interfaces (GUIs) in display windows of the OCS's display screen. The phrase "display window" as used herein refers to a visual area of the display screen configured to display a GUI. GUIs are well known to those having ordinary skill in the art, and therefore will not be described herein. Still, it should be understood that the GUIs can include, but are not limited to, content (e.g., charts, graphs, tables, and/or schematic illustrations mimicking the operations of a particular plant process). An exemplary schematic illustration of a plurality of conventional GUIs is provided in FIG. 1. As shown in FIG. 1, each of the GUIs displays time-stamped historical data and can have a toolbar configured to facilitate the movement of a time of focus backwards and/or forwards in time. The phrase "time of focus", as used herein, refers to a time period bounded by a start time and an end time in which stored time-stamped historical data was obtained. For example, the trend shown in FIG. 1 has a time of focus bounded by a start time of 6:30 AM and an end time of 8:30 AM. A user can move the time of focus by a discrete step (e.g., fifteen minutes) or directly by changing the start time, end time, and/or current time.

The conventional system suffers from certain drawbacks. For example, the ability to manipulate the time of focus is on a per content or historian application (HA) basis. As such, if a user wants to synchronize the times of focus for displayed content, then the user is required to individually manipulate the time for each content. This time manipulation can involve (a) moving the time of focus forwards (or backwards) for each displayed content and/or (b) expanding (or contracting) the time of focus for each displayed content to change a view of displayed content, a resolution of displayed content, and/or an amount of data to be displayed in a GUI. One can appreciate that this is an inefficient time manipulation process. Therefore, there is a need for a time manipulation process configured to provide a more efficient time synchronization process as compared to the time synchronization process of conventional systems.

SUMMARY OF THE INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

The present invention concerns systems and methods for providing master time control (MTC) services to a first historian application (HA) and a second HA. Each of the first and second HAs are configured to display content having a time of focus and a local time control (LTC) user interface when in an LTC mode. The LTC mode is a mode in which a local time control object is employed for manipulating the time of focus for any of the first and said second HAs. The methods involve changing a time control mode for the first and second HA from the LTC mode to an MTC mode. The MTC mode is a mode in which a master time control object is employed for manipulating the times of focus and/or other time related properties for the first and second HAs. The methods also involve synchronizing the times of focus for the first and second HAs to an MTC time of focus. This synchronization is performed in response to the time control mode change. The methods further involve displaying first and second content. Each of the first and second content comprises time-stamped historical data obtained during a period of elapsed time defined by the MTC time of focus.

BRIEF DESCRIPTION OF THE DRAWINGS

Embodiments will be described with reference to the following drawing figures, in which like numerals represent like items throughout the figures, and in which:

FIG. 6 is a schematic illustration of an exemplary time control properties (TCP) user interface according to an embodiment of the invention.

FIGS. 7A-7D collectively provide a flow diagram a method according to an embodiment of the invention for providing master time control (MTC) services to historian applications.

DETAILED DESCRIPTION

The invention concerns systems and methods for providing a common (or a master) time manipulation service to applications software. Such applications software can include, but is not limited to, historian applications for browsing historical data obtained during periods of elapsed time The phrase "historian application", as used herein, refers to applications software configured to display contents associating certain historical data obtained within a time of focus (i.e., a period of elapsed time) and to facilitate the manipulation of the time of focus by a user of the computer processing device. The periods of elapsed time can be pre-defined periods of elapsed time or ad-hoc periods of elapsed time. The ad-hoc periods of elapsed time can be created as a result of at least one user-action for changing at least one timing parameter of at least one historian application.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Before describing the methods of the present invention, it will be helpful in understanding an exemplary environment in which the invention can be utilized. In this regard, it should be understood that the methods of the present invention can be utilized in any application where an engineer, an operator, a technician, and/or another type of user needs to access and view historical information for applications software run in different areas (e.g., operation or development) and/or on different machines. Such applications include, but are not limited to, software development applications, software testing applications, and industrial plant control applications. Accordingly, the present invention will be described in relation to the industrial plant control application.

Figure 1:
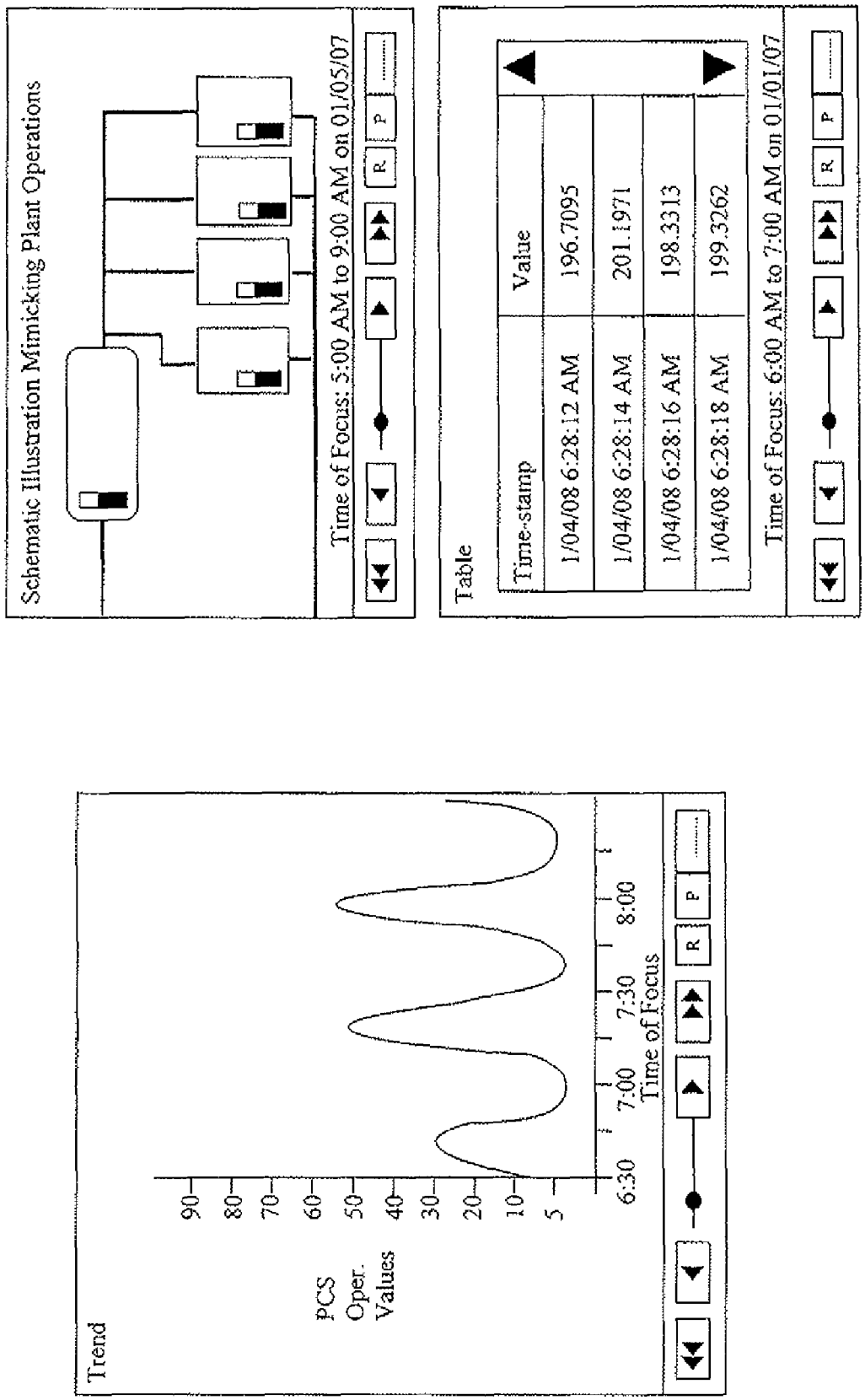
FIG. 1 is a schematic illustration of conventional graphical user interfaces (GUIs) implemented by historian applications.
Figure 2:
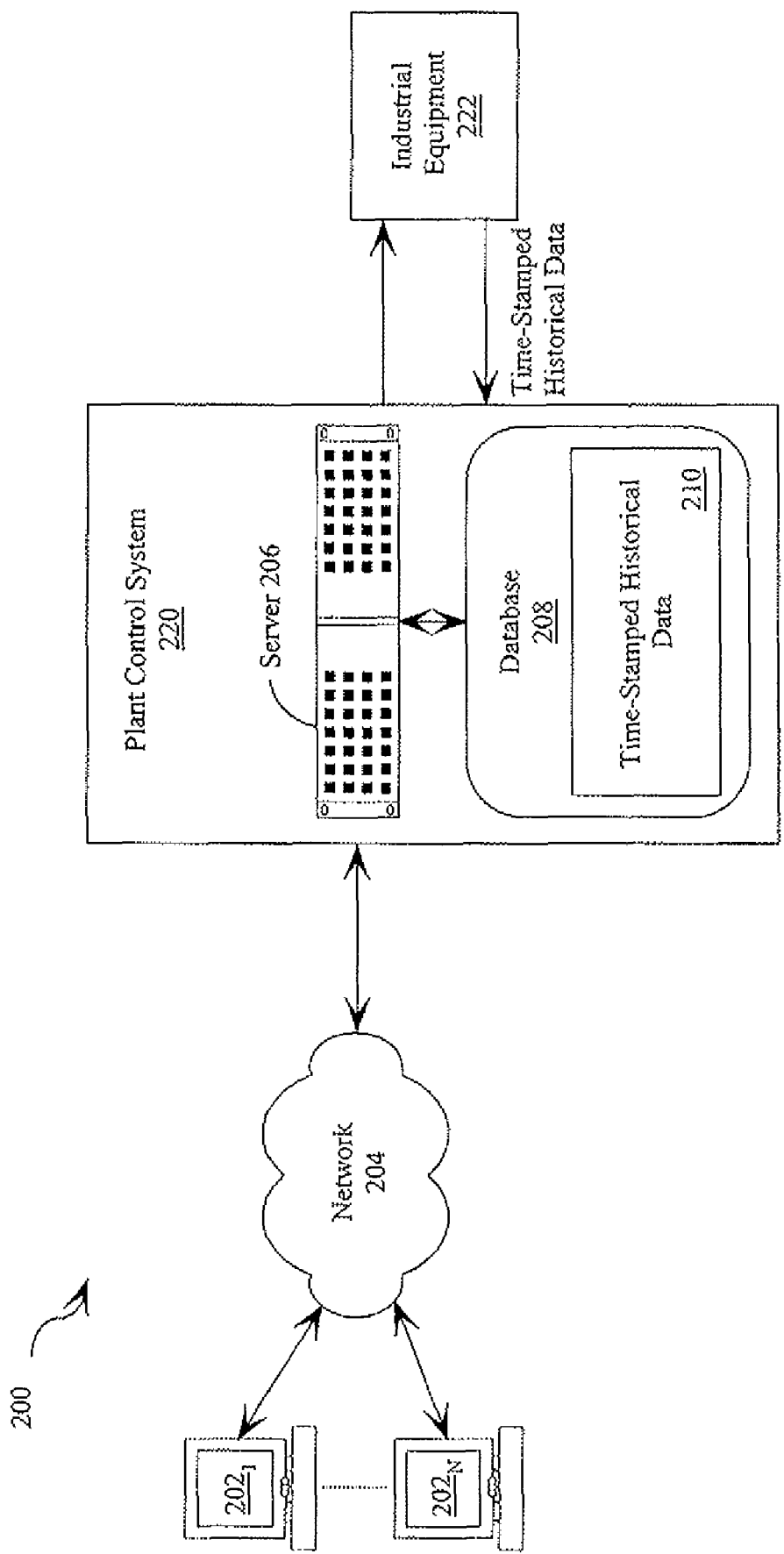
FIG. 2 is a block diagram of a plant control system according to an embodiment of the invention.

Referring now to FIG. 2, there is provided a block diagram of an industrial plant control system (IPCS) 200 according to an embodiment of the invention. As shown in FIG. 2, the IPCS 200 is comprised of computer processing devices (CPDS) 202$_1$, ..., 202$_N$, a plant control system (PCS) 220, and industrial equipment 222. The PCS 220 is configured to control industrial equipment 222. The PCS 220 can be a distributed control system, i.e., there are application specific modules connected to each other, industrial equipment, and operator interfaces via a local control network. The industrial equipment 222 may include, but is not limited to, gauges, valves, transmitters, actuators, and sensors.

The PCS 220 is comprised of a means for storing time-stamped historical data 210. For example, the PCS 220 can be comprised of a server 206 and a database 208. Servers and databases are well known to those having ordinary skill in the art, and therefore will not be described in detail herein. However, it should be understood that the server 206 is configured for receiving time-stamped historical data 210 from the industrial equipment 220 and writing the received time-stamped historical data 210 to the database 208. The time-stamped historical data 210 can include, but is not limited to, information defining the operations of the industrial equipment 222 at particular times of a day. For example, if the industrial equipment 222 is a tank, then the time-stamped historical data 210 includes information defining liquid levels of the tank at pre-defined times of a day and/or temperatures of the liquid at the pre-defined times of a day. The invention is not limited in this regard. The time-stamped historical data 210 can include any information selected in accordance with a particular system application.

The server 206 is also configured to communicate with the CPDs 202$_1$, ..., 202$_N$ for displaying process monitoring information, process control information, and/or time-stamped historical information 210 to a user (e.g., an operator, a technician, or an engineer). In this regard, it should be understood that the server 206 is also configured to receive a message including a request for time-stamped historical data 210 from a CPD 202$_1$, ..., 202$_N$, access the database 208, retrieve time-stamped historical data 210 from the database 208, and communicate the retrieved time-stamped historical data 210 to the CPD 202$_1$, ..., 202$_N$. The server 206 can be communicatively coupled to the CPDs 202$_1$, ..., 202$_N$ via the network 204. The network 204 can be a variety of networks, such as a local area network, a wide area network, or a personal area network.

Referring again to FIG. 2, each of the CPDs 202$_1$, ..., 202$_N$ can be a remote terminal connected to a mainframe (not shown) or an individual computer system. If the CPDs 202$_1$, ..., 202$_N$ are remote terminals, then embodiments of the present invention can be at least partially implemented by the mainframe. If the CPIs 202$_1$, ..., 202$_N$ are individual computer systems, then embodiments of the present invention can be at least partially implemented by microprocessors of each individual computer system. The invention is not limited in this regard. For example, embodiments of the present invention can be at least partially implemented on any known centralized or decentralized computing system.

The following discussion of the CPDs 202$_1$, ..., 202$_N$ is provided in relation to the scenario in which the CPDs are individual computer systems. In the individual computer system scenario, each of the CPDs 202$_1$, ..., 202$_N$ is a desktop personal computer system, a laptop personal computer system, a personal digital assistant, a wireless computer processing device, or any other general purpose computer processing device. Accordingly, each of the CPDs 202$_1$, ..., 202$_N$ is configured to display graphical user interfaces (GUIs) in an area of a common desktop interface (such as a Uniformance Process Studio (UPS) user interface 320 described below in relation to FIG. 3 and FIG. 5). GUIs are well known to those having ordinary skill in the art, and therefore will not be described in detail herein. However, it should be understood that the GUIs can contain information necessary for enabling a user (e.g., an operator, a technician, or an engineer) to monitor the industrial equipment 222, to control the industrial equipment 222, to view time-stamped historical data 210, and to browse time-stamped historical data 210 over pre-defined periods of elapsed time (e.g., thirty minutes, one hour, two hours, four hours, a day, a week, and/or a month).

Figure 3:
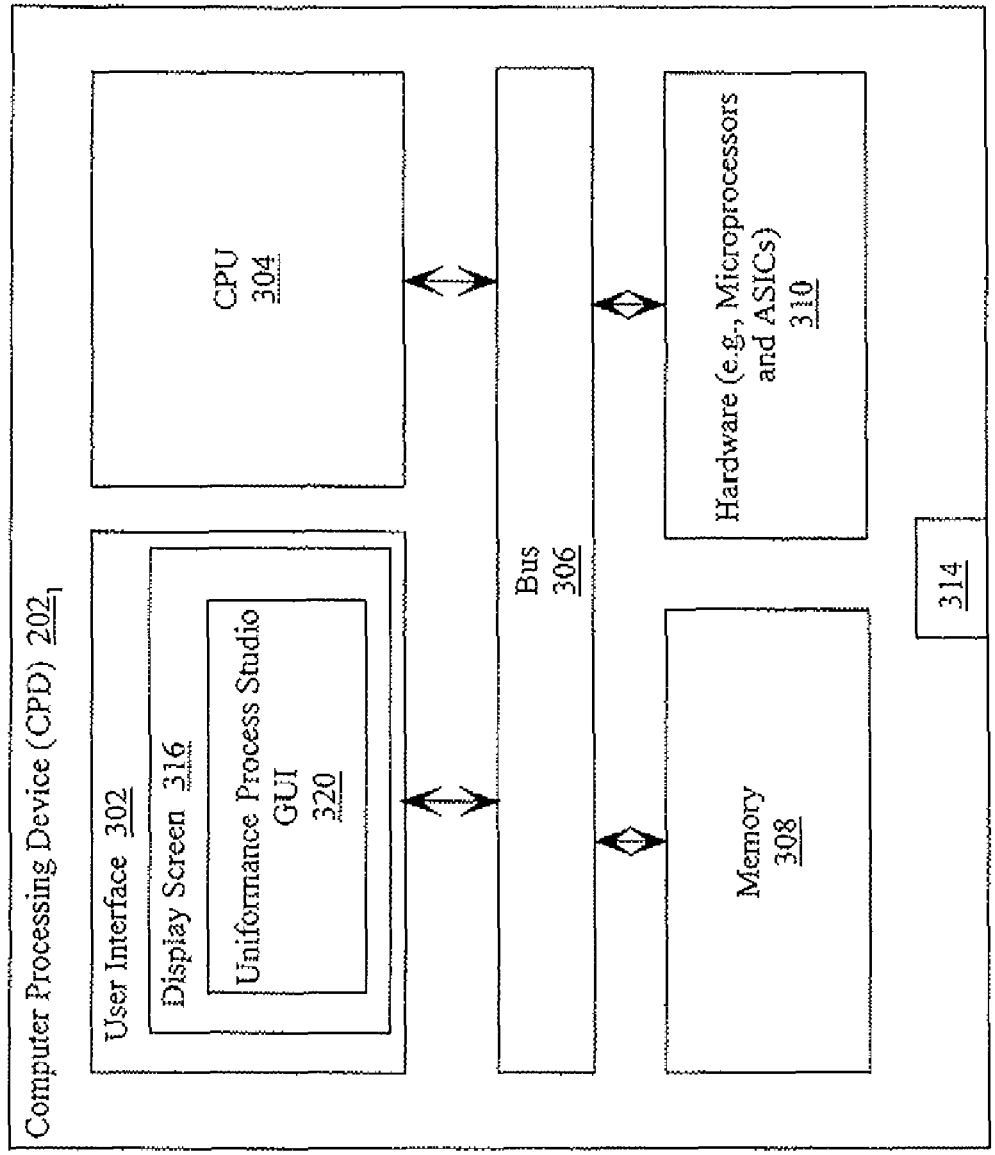
FIG. 3 is a more detailed block diagram of the computer processing device according to an embodiment of the invention.

Referring now to FIG. 3, there is provided a more detailed block diagram of a CPD 202$_1$ shown in FIG. 2. It should be understood that the CPDs 202$_2$, ..., 202$_N$ are the same as or substantially similar to the CPD 202$_1$. As such, the description provided below in relation to CPD 202$_1$ is sufficient for understanding CPDs 202$_2$, ..., 202$_N$.

As shown in FIG. 3, the CPD $202_1$ is comprised of a system interface 314, a user interface 302, a central processing unit 304, a system bus 306, a memory 308 connected to and accessible by other portions of the CPD $202_1$ through the system bus 306, and hardware entities 310 connected to the system bus 306. At least some of the hardware entities 310 perform actions involving access to and use of the memory 308, which may be a random access memory (RAM), a disk driver, and/or a compact disc read only memory (CD-ROM).

The hardware entities 310 may include microprocessors, application specific integrated circuits (ASICs), and other hardware. The hardware entities 310 may include a microprocessor programmed for communicating with the server 206 (described above in relation to FIG. 2). More particularly, the hardware entities 310 may include a microprocessor programmed for generating messages including requests for specific time-stamped historical data 210 and communicating the messages to the server 206 (described above in relation to FIG. 2). The messages can be generated in response to user-actions performed by a user of historian application (HA) employing local time control (LTC) and/or master time control (MTC).

The phrase "historian application", as used herein, refers to applications software configured to display contents associating certain historical data obtained within a time of focus (i.e., a period of elapsed time) and to facilitate the manipulation of the time of focus by a user of the CPD $202_1$. As noted above, the phrase "time of focus", as used herein, refers to a time period bounded by a start time and an end time in which stored time-stamped historical data 210 was obtained. Data for such contents can include, but is not limited to, trends, charts, graphs, tables, and/or schematic illustrations mimicking the operations of a particular plant process.

The phrase "local time control", as used herein, refers to a technique for controlling timing features, timing parameters, and/or a time of focus for a single HA. The phrase "master time control", as used herein, refers to a technique for controlling timing parameters, timing features, and/or a time of focus for at least two HAs. The timing parameters can include, but are not limited to, an absolute or relative start time parameter, an absolute or relative end time parameter, a dynamic start time parameter, a dynamic end time parameter, an absolute or relative current time parameter, at least one step forwards/backwards interval parameter, a refresh interval parameter, and a fast replay parameter. The timing features can include (but are not limited to): a step forwards feature for advancing a time of focus for at least one HA forwards by a pre-defined increment of time (e.g., at least one minute or at least one hour); a step backwards feature for moving a time of focus for at least one HA backwards by a pre-defined increment of time (e.g., at least one minute or at least one hour); a refresh feature for updating HA GUI content with new historical data 210; and a fast replay feature for displaying HA GUI content including dynamically changing information reproducing operations of industrial equipment 222 during a pre-defined period of elapsed time.

The microprocessor can also be programmed for processing and displaying time-stamped historical data 210 received from the server 206. The microprocessor can further be configured for displaying HA GUI content illustrating information defined by time-stamped historical data 210 obtained during a period of elapsed time. The microprocessor can be configured for displaying HA GUI content including information dynamically changing in accordance with a specified frequency and time increment (e.g., a displayed tank level value is dynamically updated every five second, wherein each displayed tank level value was obtained during a pre-defined period of elapsed time). It should be noted that information (e.g., values) may be manually added to the HA GUI or added to the HA GUI based on events.

The microprocessor can further be programmed for performing application specific operations for local time control (LTC) and/or master time control (MTC). Such LTC operations can include (but are not limited to): transitioning from an MTC mode to an LTC mode in response to a user-action; hiding an LTC user interface (e.g., an LTC user interface 532 described below in relation to FIG. 5) when an HA is in an MTC mode; and revealing the LTC user interface when an HA is in an LTC mode. The phrase "LTC mode", as used herein, refers to a mode of an HA in which LTC (or an LTC data object) is employed. The phrase "MTC mode", as used herein, refers to a mode of an HA in which MTC (or MTC data object) is employed. An exemplary LTC user interface will be described below in relation to FIG. 5.

Figure 5:
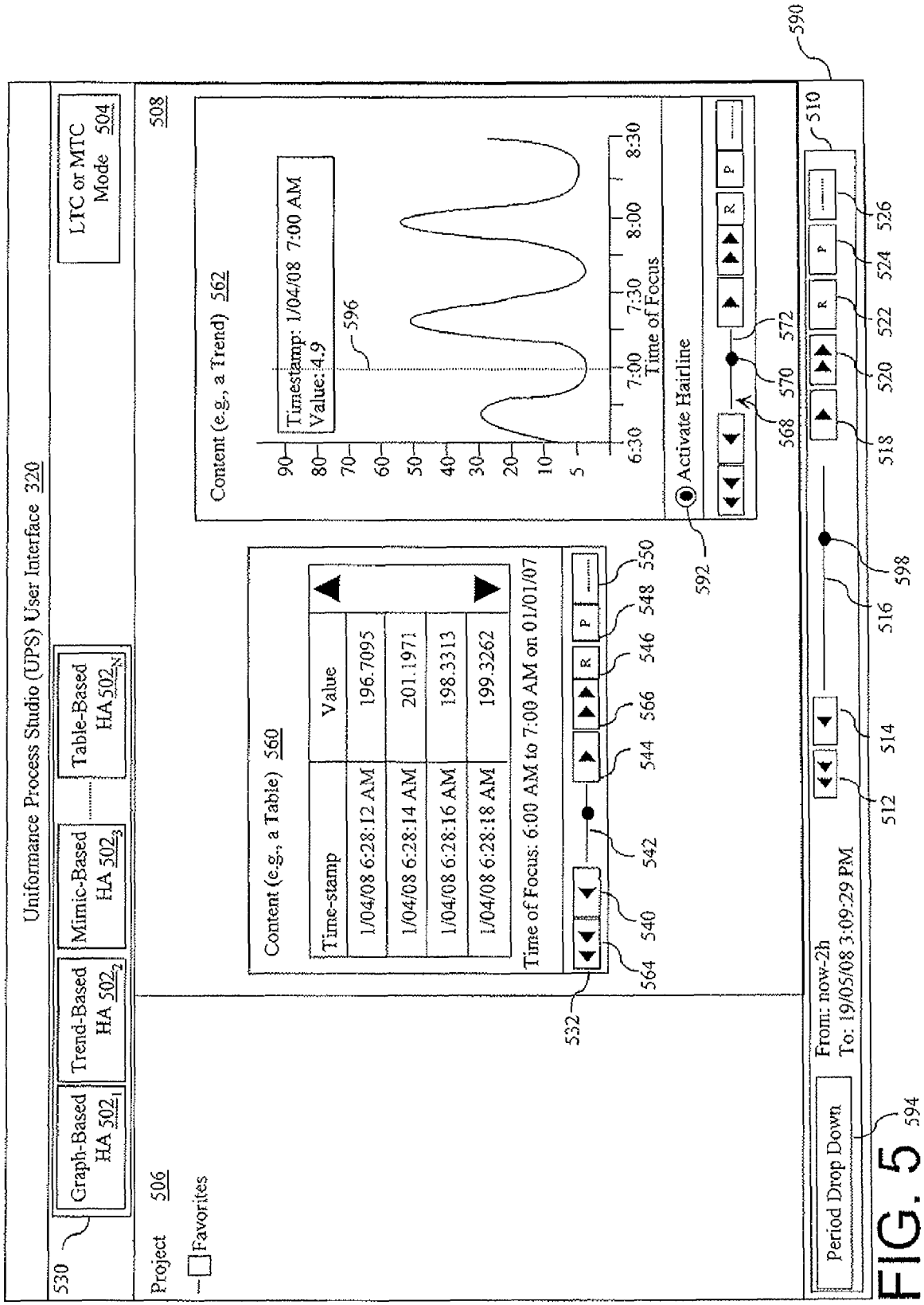
FIG. 5 is a schematic illustration of an exemplary Uniformance Process Studio (UPS) user interface according to an embodiment of the invention.

Such LTC operations can also include (but are not limited to): defining timing parameters in response to a user action; changing timing parameter values in response to a user action; changing data of displayed HA GUI content in accordance with the changed timing parameter values; changing data of a displayed HA GUI content by moving a time of focus forwards in response to a user action (e.g., clicking a step forwards button 544, 566 of an LTC user interface 532 described below in relation to FIG. 5); changing data of a displayed HA GUI content by moving a time of focus backwards in response to a user action (e.g., clicking a step backwards button 540, 564 of the LTC user interface described below in relation to FIG. 5); refreshing the data of a displayed HA GUI content in response to a user action (e.g., clicking a refresh button 546 of the LTC user interface described below in relation to FIG. 5); and dynamically changing content of a displayed HA GUI content in response to a user action (e.g., clicking a fast replay button 548 of the LTC user interface 532 described below in relation to FIG. 5).

Such MTC operations can include (but are not limited to): transitioning from an LTC mode to an MTC mode in response to a user-action; hiding an MTC user interface (e.g., the MTC user interface 510 described below in relation to FIG. 5) when an HA is in an LTC mode; and revealing the MTC user interface when an HA is in an MTC mode. An exemplary MTC user interface will be described below in relation to FIG. 5.

Such MTC operations can also include (but are not limited to): defining timing parameters for a plurality of HAs in response to a user action; changing timing parameter values for a plurality of HAs in response to a user action; changing data of displayed HA GUI content in accordance with the changed timing parameter values; changing data of displayed HA GUI content by moving an MTC time of focus forwards in response to a user action (e.g., clicking a step forwards button 518, 520 of an MTC user interface 510 described below in relation to FIG. 5); changing data of displayed HA GUI content by moving an MTC time of focus backwards in response to a user action (e.g., clicking a step backwards button 512, 514 of the MTC user interface 510 described below in relation to FIG. 5); refreshing data of the displayed HA GUIs in response to a user action (e.g., clicking a refresh button 522 of the MTC user interface 510 described below in relation to FIG. 5); and dynamically changing content of displayed HA GUI contents in response to a user action (e.g., clicking a play button 524 of the MTC user interface 510 described below in relation to FIG. 5). It should be noted that the time of focus can also be moved forwards or backwards by changing a current time.

The user interface 302 is comprised of input devices, output devices, and software routines configured to allow a user to interact with and control software applications installed on the CPD $202_1$. Such input and output devices include, but are not limited to, a display screen 316, a speaker (not shown), a keypad (not shown), a directional pad (not shown), a directional knob (not shown), and a microphone (not shown). As such, the user interface 302 can facilitate a user-software interaction for communicating with the hardware entities 310 and an external device (e.g., the server 206 described above in relation to FIG. 2). The user interface 302 can also facilitate access to Uniformance Process Studio (UPS) software, running UPS software, and displaying a Uniformance Process Studio (UPS) user interface 320 on the display screen 316. UPS software is well known to those having ordinary skill in the art, and therefore will not be described herein. The UPS user interface 320 will be described below in relation to FIG. 5.

According to an embodiment of the invention, the UPS software is UPS software provided by Honeywell International, Inc. of Morristown, N.J. The UPS software provides a UPS user interface in which historian applications can be accessed and run. The invention is not limited in this regard.

The user interface 302 can also facilitate a user-software interaction for starting a desktop application, running HAs outside of or from within the desktop application (e.g., UPS software), and selecting a time control mode (e.g., an LTC mode or an MTC mode) for running HAs. If the running HAs are in LTC modes, then a user individually manipulates the timing features, timing parameters, and/or times of focus for each of the running HAs. In contrast, if the running HAs are in MTC modes, then a user simultaneously manipulates the timing features, timing parameters, and/or times of focus for the running HAs.

The system interface 314 allows the CPD $202_1$ to communicate directly or indirectly with the PCS 220. If the CPD $202_1$ is communicating indirectly with the PCS 220, then the CPD $202_1$ sends and receives communications through the network 204 (described above in relation to FIG. 2).

The CPD $202_1$ can generally support any suitable software architecture including those known to persons having ordinary skill in the art. For example, the CPD $202_1$ can support device drivers, an operating system, platform devices, providers, and services. A software architecture according to an embodiment of the invention is illustrated in FIG. 4.

Figure 4:
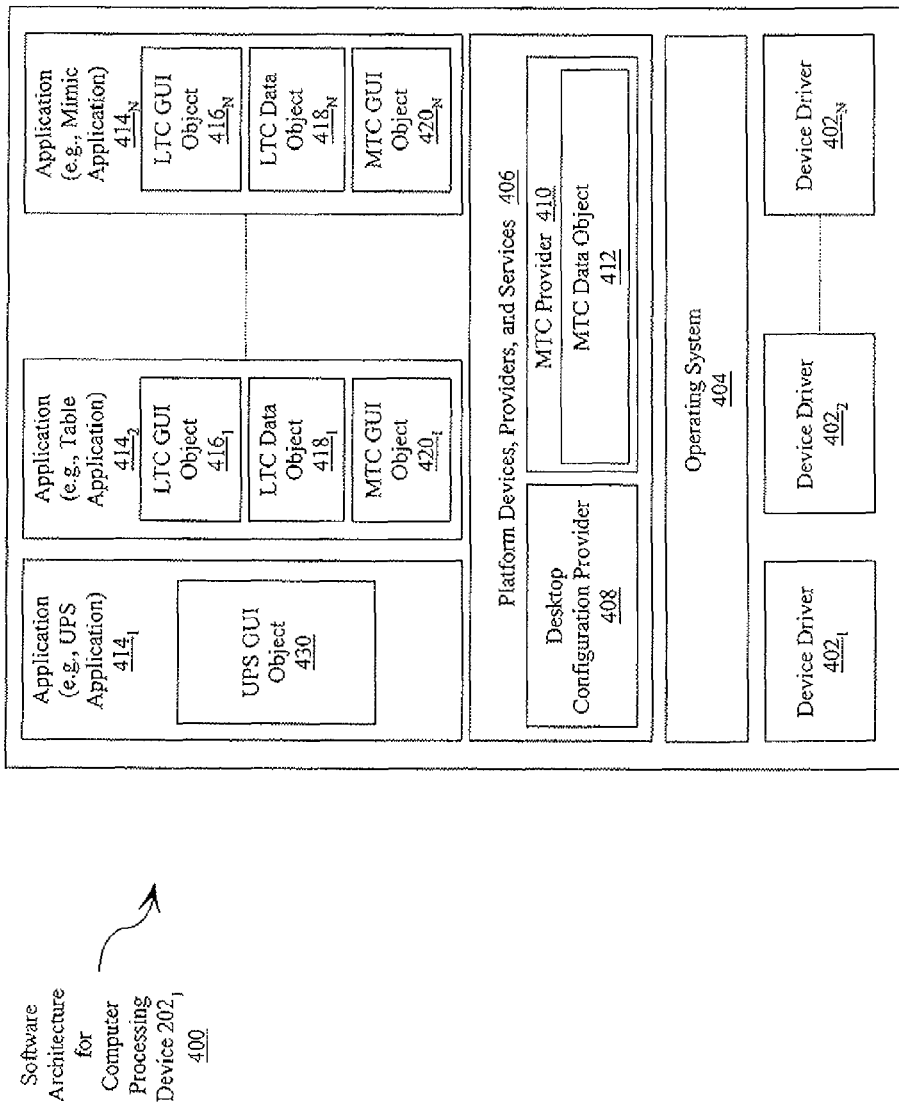
FIG. 4 is a block diagram of an exemplary software architecture for the computer processing device of FIG. 3 according to an embodiment of the invention.

Referring now to FIG. 4, an exemplary software architecture 400 for the CPD $202_1$ is provided. The software architecture 400 can include levels of software programs. As shown in FIG. 4, the software architecture 400 includes device driver software programs $402_1$, $402_2$, ..., $402_N$, an operating system 404, platform device/provider/service (PDPS) software programs 406, and software applications $414_1$, $414_2$, ..., $414_N$. The software programs $402_1$, $402_2$, ..., $402_N$, 404 of the software architecture 400 are well known to persons having ordinary skill in the art. Thus, the software programs $402_1$, $402_2$, ..., $402_N$, 404 will not be described in detail herein. However, a brief description of the software architecture 400 is provided to assist a reader in understanding the present invention.

A device driver software program $402_1$, $402_2$, ..., $402_N$ typically is software the CPD $202_1$ uses to facilitate communications between hardware components (e.g., hardware components 302, 304, 308, 310 described above in relation to FIG. 3). A device driver software program $402_1$, $402_2$, ..., $402_N$ can include code for managing access to hardware components, setting hardware component parameters, and transmitting data between hardware components.

The operating system 404 is system software responsible for the direct control and management of the CPD $202_1$ hardware (e.g., hardware components 302, 304, 308, 310 described above in relation to FIG. 3). Typically, the operating system 404 manages basic CPD $202_1$ operations, such as loading and running software applications. The operating system 404 is also system software responsible for enabling a user to control hardware coupled to the CPD $202_1$. The operating system 404 can also include instructions to install, launch, and manage applications. The operating system 404 is typically stored in memory 308 (described above in relation to FIG. 3) which may be a ROM, hard drive, or other storage device.

The PDPS software programs 406 includes a desktop configuration provider (DCP) 408 and an MTC provider 410. The invention is not limited in this regard. For example, the PDPS software programs 406 can further include a communications provider and other providers/services known in the art. The DCP 408 is software responsible for the direct control and management of desktop configurations. Desktop configurations are well known to those having ordinary skill in the art, and therefore will not be described herein.

The MTC provider 410 is software responsible for providing MTC functionalities to HAs. The MTC provider 410 is comprised of an MTC data object 412. The MTC data object 412 is software including instructions for receiving messages from the MTC GUI objects $420_1$, ..., $420_N$ and processing the data contained in the messages. The MTC data object 412 also comprises instructions for updating timing parameters and communicating updated timing parameters to the MTC GUI objects $420_1$, ..., $420_N$ and/or applications $414_1$, ..., $414_N$. The MTC data object 412 further comprises instructions for calculating (or re-calculating) a start/end/current time value(s), updating the start/end/current time value(s) with the result of the calculation, and communicating the updated start/end/current time value(s) to the MTC GUI objects $420_1$, ..., $420_N$ and/or applications $414_1$, ..., $414_N$. The MTC data object 412 can comprise instructions for calculating (or re-calculating) a time of focus, updating the time of focus value with the result of the calculation, and communicating the updated time of focus to the MTC GUI objects $420_1$, ..., $420_N$ and/or applications $414_1$, ..., $414_N$. The MTC data object 412 can comprise instructions for obtaining time-stamped historical data 210 from the PCS 200 and communicating time-stamped historical data 210 to the MTC GUI objects $420_1$, ..., $420_N$. It should be noted that a drag-and-drop action of a timerange context onto a user interface (LTC or MTC) can also change the time of focus.

The software applications $414_1$, $414_2$, ..., $414_N$ typically include programs designed for end users. The software applications $414_1$, $414_2$, ..., $414_N$ are typically installed on the CPD $202_1$. It should be noted that the software applications $414_1$, $414_2$, ..., $414_N$ can be configured to change a time of focus.

As shown in FIG. 4, the software applications $414_1$, $414_2$, ..., $414_N$ can comprise UPS software $414_1$ and HAs $414_2$, ..., $414_N$. The UPS software $414_1$ can include a UPS object 430. The UPS object 430 is software combining code objects with GUI elements to create a UPS user interface 320 (described below in relation to FIG. 5). HAs $414_2$, ..., $414_N$ can be accessed, run, and used from within the UPS user interface 320.

Each of the HAs $414_2$, ..., $414_N$ includes an LTC GUI object $416_1$, ..., $416_N$, an LTC data object $418_1$, ..., $418_N$, and an MTC GUI object $420_1$, ..., $420_N$. Notably, each LTC GUI object $416_1$, ..., $416_N$, LTC data object $418_1$, ..., $418_N$, and MTC GUI object $420_1$, ..., $420_N$ is created during the initialization of a respective HA $414_2, \ldots, 414_N$. Each of the LTC GUI objects $416_1, \ldots, 416_N$ is bounded to a respective LTC data object $418_1, \ldots, 418_N$. Similarly, each of the MTC GUI objects $420_1, \ldots, 420_N$ is bounded to the MTC data object 412. The term "bound", as used herein, means that objects are configured for communicating with each other. The term "initialize", as used herein, refers to process of preparing an application for use by calling certain functions. The initialization of the HAs $414_2, \ldots, 414_N$ is typically performed when the UPS $414_1$ software is run. The providers 406 are created as part of the UPS $414_1$ software initialization process. The objects $416_1, \ldots, 416_N, 418_1, \ldots, 418_N, 420_1, \ldots, 420_N$ are created when a user requests a respective HA $414_2, \ldots, 414_N$.

Each of the LTC GUI objects $416_1, \ldots, 416_N$ is software combining code objects with GUI elements to create an LTC user interface (e.g., the LTC user interface 532 described below in relation to FIG. 5). Each of the LTC GUI objects $416_1, \ldots, 416_N$ can include instructions for communicating messages to a respective LTC data object $418_1, \ldots, 418_N$. The messages can include information indicating that certain events have occurred (e.g., a user has clicked a certain button of the time control). Each of the LTC GUI objects $416_1, \ldots, 416_N$ can also include instructions for receiving messages from the respective LTC data object $418_1, \ldots, 418_N$, and changing (updating or refreshing) data of a displayed HA GUI in response to the message(s).

Each of the LTC data objects $418_1, \ldots, 418_N$ is software comprising instructions for receiving messages from the LTC GUI objects $416_1, \ldots, 416_N$ and processing the data contained in the messages. Each of the LTC data objects $418_1, \ldots, 418_N$ also comprises instructions for updating timing parameters and communicating updated timing parameters to the LTC GUI objects $416_1, \ldots, 416_N$. Each of the LTC data objects $418_1, \ldots, 418_N$ further comprises instructions for calculating (or re-calculating) a start/end/current time value(s), updating the start/end/current time value(s) with the result of the calculation, and communicating the updated start/end/current time value(s) to the LTC GUI objects $416_1, \ldots, 416_N$. Each of the LTC data objects $418_1, \ldots, 418_N$ can comprise instructions for calculating (or re-calculating) a time of focus, updating the time of focus value with the result of the calculation, and communicating the updated time of focus to the LTC GUI objects $416_1, \ldots, 416_N$. Each of the LTC data objects $418_1, \ldots, 418_N$ can comprise instructions for obtaining time-stamped historical data 210 from the PCS 200 and communicating time-stamped historical data 210 to the LTC GUI objects $416_1, \ldots, 416_N$. Alternatively, the HA $414_2, \ldots, 414_N$ or LTC GUI objects $416_1, \ldots, 416_N$ may read the exposed properties of the LTC data objects $418_1, \ldots, 418_N$ when required. The HA $414_2, \ldots, 414_N$ or MTC GUI objects $420_1, \ldots, 420_N$ may read the exposed properties of the MTC data object 412.

Each of the MTC GUI objects $420_1, \ldots, 420_N$ is software combining code objects with GUI elements to create an MTC user interface (e.g., the MTC user interface 510 described below in relation to FIG. 5). Each of the MTC GUI objects $420_1, \ldots, 420_N$ can include instructions for communicating messages to the MTC data object 412. The messages can include information indicating that certain events have occurred (e.g., a user has clicked a certain button of a toolbar). Each of the MTC GUI objects $420_1, \ldots, 420_N$ can also include instructions for receiving messages from the MTC data object 412 and changing (updating or refreshing) data of a displayed content in response to the message(s).

It should be noted that each of the data objects 412, $418_1, \ldots, 418_N$ can be changed via code written by a user (e.g., a customer, an engineer, a technician, or a supervisor) using an application running outside of or from within the desktop application (e.g., UPS software) or other service provided by the desktop application. As such, the user can construct a customized time control user interface (e.g., a customized time control user interface configured to replace standard time control user interfaces 510, 532 described below in relation to FIG. 5).

Referring now to FIG. 5, a schematic illustration of an exemplary Uniformance Process Studio (UPS) user interface 320 is provided. As shown in FIG. 5, the UPS user interface 320 is comprised of a workspace portion 506, a content/GUI display area 508, a tool or ribbon bar 530, and an MTC user interface 590. The workspace portion 506 is configured to facilitate user-software interactions for adding content to a favorites file, removing contents from the favorites file, and/or quickly accessing content of the favorites file for purposes of starting the same. The workspace portion 506 can also be configured to facilitate user-software interactions for quickly accessing HAs for purposes of launching the same. The term "launch", as used herein, means to start a software program or application.

The content/GUI display area 508 is provided for displaying content (e.g., tables and trends) 560, 562 and/or LTC user interfaces 532 to a user (e.g., an operator, a technician, or an engineer). The LTC user interfaces 532 are provided for facilitating user-software interactions for performing LTC operations. Notably, the LTC user interfaces 532 can be hidden when the respective HAs are in an MTC mode. Each of the LTC user interfaces 532 can include a tool bar or status strip comprising a plurality of widgets.

According to an embodiment of the invention, the LTC user interfaces 532 can comprise buttons 564, 540, 544, 566, 546, 548, 550 and a sliding bar 542. The buttons 540, 564 can facilitate user-software interactions for moving a time of focus of at least one running HA backwards in time by a pre-defined increment of time (e.g., at least one minute or at least one hour). The buttons 544, 566 can facilitate user-software interactions for moving a time of focus of at least one running HA forwards in time by a pre-defined increment of time. The button 546 can facilitate a user-software interaction for updating respective content 560, 562 with new historical data 210. The button 548 can facilitate a user-software interaction for dynamically changing information reproducing operations of industrial equipment 222 during a pre-defined period of elapsed time. The button 550 can facilitate user-software interactions for defining and/or changing timing parameters of a respective HA. The sliding bar 542 can facilitate a user-software interaction for moving the current time of an HA. The invention is not limited in this regard. The LTC user interfaces 532 can include any type and number of widgets selected in accordance with a particular LTC user interface application.

According to an embodiment of the invention, the content 562 is a trend. In such a scenario, a hairline activation widget 592 can be provided for activating or deactivating a hairline 596. The hairline 596 is a GUI element that can be moved in horizontal directions by clicking on the hairline and dragging the hairline to a location of interest within the content. The hairline 596 also conveys time-stamped historical data 210 to a user (e.g., an operator, a technician, or engineer). A sliding bar (e.g., the sliding bar 572 in LTC mode or the sliding bar 516 in MTC mode) can also facilitate an indirect movement of the hairline by clicking on a thumbtack 570, 598 and dragging it to a location of interest along the bar 572, 516. The location of the thumbtack 570, 598 can also be indirectly changed in accordance with the direct movement of the hairline 596. The invention is not limited in this regard.

Referring again to FIG. 5, the tool or ribbon bar 530 is provided for facilitating user-software interactions for launching HAs and/or placing a plurality of running HAs in an LTC or MTC mode. For example, the tool or ribbon bar 530 can be comprised of a plurality of buttons $502_1, \ldots, 502_N$ for facilitating user-software interactions for launching HAs. The tool or ribbon bar 530 can also be comprised of at least one button 504 for changing a mode of at least one HA from an LTC mode to an MTC mode, and vise versa. The invention is not limited in this regard. The tool or ribbon bar 530 can comprise any type of widget selected in accordance with a particular time control application.

It should be noted that the tool or ribbon bar 530 shown in FIG. 5 is an exemplary embodiment of a tool or ribbon bar. Embodiments of the invention are not limited to the configuration shown in FIG. 5. For example, if none of the HAs is launched, then a set of buttons for creating an instance of a graphic and/or trend can appear at a top-left of the UPS user interface 320 and/or below the tool or ribbon bar 530. If an HA is launched, then the tool or ribbon bar 530 can change to expose controls related to the HA. As should be understood, the tool or ribbon bar 530 can be changed each time an HA is launched. Also, the controls for the HAs (e.g., trend and graph) can be application specific.

Referring again to FIG. 5, the MTC user interface 590 can include a tool bar or status strip 510 comprising a plurality of widgets. The invention is not limited in this regard. For example, the MTC user interface 590 can be provided in a separate window as opposed to an object of the UPS user interface 320. The MTC user interface 590 can be hidden when running HAs are in LTC modes. The MTC user interface 590 facilitates user-software interactions for performing MTC operations to simultaneously control and/or manipulate timing features, timing parameters, and/or times of focus for various types and numbers of displayed content.

According to an embodiment of the invention, the tool bar or status strip 510 of the MTC user interface 590 comprises a plurality of buttons 512, 514, 518, 520, 522, 524, 526, a sliding bar 516, and a drop down menu 594. The buttons 512, 514 facilitate a user-software interactions for moving a time of focus (i.e., a start time and/or an end time) of displayed content 560, 562 backwards by a pre-defined increment of time (e.g., at one minute or at one hour). The pre-defined increment of time associated with the button 512 can be larger than the pre-defined increment of time associated with the button 514. Similarly, the buttons 518, 520 facilitate user-software interactions for moving a time of focus (i.e., a start time and/or an end time) of displayed content 560, 562 forwards by a pre-defined increment of time (e.g., at least one minute or at least one hour). The pre-defined increment of time associated with the button 520 can be larger than the pre-defined increment of time associated with the button 518. The refresh button 522 facilitates a user-software interaction for updating the content 560, 562 with new historical data 210. The button 524 is a play button allowing current time to be automatically incremented from a start time to an end time and continue playing in real time. As such, the play button 524 facilitates a user-software interaction for dynamically changing content 560, 562 information reproducing operations of industrial equipment 222 during a pre-defined period of elapsed time. The button 526 facilitates user-software interactions for defining and/or changing timing parameters of a plurality of running HAs. The drop down menu 594 facilitates a user-software interaction for changing to a pre-defined a period of time. The sliding bar 516 facilitates (a) a user-software interaction for simultaneously moving hairlines 596 of displayed content to locations of interest within the content, and/or (b) a user-software interaction for changing an MTC current time. The invention is not limited in this regard. The MTC user interfaces 590 can include any type and number of widgets selected in accordance with a particular MTC user interface application.

FIG. 6 is a schematic illustration of an exemplary time control properties (TCP) user interface 600 according to an embodiment of the invention. The TCP user interface 600 can be displayed in the UPS user interface 320 when a button 550 of an LTC user interface 532 or a button 526 of the MTC user interface 510 is clicked by a user (e.g., an operator, a technician, or engineer). As shown in FIG. 6, the TCP user interface 600 generally includes drop down menus for selecting values for certain timing parameters. Such timing parameters include, but are not limited to, a time period parameter, a start time parameter, an end time parameter, a refresh time interval parameter, a fast replay parameter, a small step parameter, and a large step parameter. Notably, the start, end, and current time parameters can be selected as an absolute parameter or a relative parameter. An absolute parameter is a parameter that does not change over time (e.g., a start time is set at 2:30 AM and will remain at 2:30 AM despite changes in actual time). In contrast, a relative parameter is a parameter that increments in accordance with changes in actual time (e.g., a start time is set at 2:30 AM and will increment to 2:31 AM in response to a change in actual time from 1:30 PM to 1:31 PM). The TCP user interface 600 also generally includes a sliding bar for changing a current time parameter. The TCP user interface 600 also generally includes an "OK" button configured to facilitate a user-software interaction for storing changed parameter values and updating the data of displayed content 560, 562 in accordance with the changed parameter values. The "Cancel" button facilitates a user-software interaction for closing the TCP user interface 600 without storing new parameter values.

The following FIGS. 7A-7D and accompanying text illustrate an exemplary method 700 for providing master time control (MTC) services to historian applications (HAs). It should be appreciated, however, that the method disclosed herein is provided for purposes of illustration only and that the present invention is not limited solely to the method shown.

Referring now to FIG. 7A, there is provided a flow diagram of an exemplary method 700 for providing MTC services to historian applications (HAs). As shown in FIG. 7A, the method 700 begins at step 702 and continues with step 704. In step 704, a desktop application is created. The desktop application is configured to enable the browsing of time-stamped historical data 210 by a user (e.g., an operator, a technician, or an engineer) of a CPD $202_1, \ldots, 202_N$. The desktop application provides an optional common desktop interface (e.g., the UPS user interface 320 of FIG. 5) and an MTC data object 412. The desktop application facilitates the subscription of HAs to the MTC data object 412 so that their timing features, timing parameters, and/or times of focus can be simultaneously controlled and/or manipulated by a user of the desktop application. The term "subscribe", as used herein, refers to a technique where a first application (e.g., an HA) or object exchanges data (e.g., time-stamped historical data 210 of FIG. 2) with a second application or object via MTC data object 412.

In step 706, the desktop application is started. Notably, the desktop application is installed on a CPD $202_1, \ldots, 202_N$. The desktop application can be started automatically or in response to a user action (e.g., clicking on a desktop icon for the desktop application). Thereafter, the method 700 continues with step 708. Step 708 generally involves displaying the UPS user interface 320 on a display screen 316 of the CPD $202_1, \ldots, 202_N$. Since there are no HAs running at this time, the UPS user interface 320 is absent of content 560, 562. However, it should be understood that if the HAs are in LTC mode then the LTC user interfaces 532 are visible and reflect the timing parameter values stored in each of their LTC data objects $418_1, \ldots, 418_N$. If the HAs are in MTC mode, then the MTC user interface 510 is visible with timing parameter values as currently configured.

Subsequently, step 710 is performed where at least two HAs $414_1, \ldots, 414_N$ are launched from within the desktop application. It should be noted that a widget (e.g., button 504 of FIG. 5) is not displayed to a user until an HA $414_1, \ldots, 414_N$ is fully loaded and running. Once an HA is running and a GUI is displayed, the widget (e.g., button 504 of FIG. 5) is displayed so that a user can place the HA $414_1, \ldots, 414_N$ in an LTC mode or an MTC mode. The HAs $414_1, \ldots, 414_N$ can be simultaneously placed in a particular mode.

After completion of step 710, step 712 is performed. In step 712, previously saved documents are opened for each of the launched HAs $414_1, \ldots, 414_N$. The documents can be opened in response to a user action (e.g., selecting icons displayed in a workspace 506 of FIG. 5). Upon completing step 712, step 714 is performed where the content 560, 562 is displayed in the content/GUI display area 508 of the UPS user interface 320. Step 714 also involves placing the HAs in an LTC mode. In response to being placed in their LTC modes, LTC user interfaces 532 for each type of content 560, 562 is displayed in the content/GUI display area 508 of the UPS user interface 320. Also, an MTC user interface 510 can be hidden when the LTC user interfaces 532 are displayed.

After step 714, the method 700 continues with step 716 of FIG. 7B. Step 716 generally involves changing the modes of the running HAs $414_1, \ldots, 414_N$ from LTC modes to MTC modes. The mode changes can generally be achieved by clicking at least one button 504. It should be noted that the modes of the HAs $414_1, \ldots, 414_N$ can be simultaneously changed from LTC modes to MTC modes. By clicking the button 504, a message is sent from the UPS GUI object 430 (or MTC GUI object $420_1, \ldots, 420_N$) to the MTC data object 412 indicating that an event has occurred. The message can also include LTC timing parameters for a particular HA $414_1, \ldots, 414_N$. Upon receipt of the message, the MTC data object 412 can (a) update the MTC timing parameters in accordance with the received LTC timing parameters, and/or (b) send commands to the MTC GUI objects $420_1, \ldots, 420_N$ and/or HAs $414_1, \ldots, 414_N$ for changing their modes.

As a result of changing the modes, steps 718 and 720 are performed simultaneously or in any order. In step 718, each of the HAs $414_1, \ldots, 414_N$ hides a respective LTC user interface 532. Step 718 also involves displaying the MTC user interface 510 in a toolbar of the UPS user interface 320 or in a separate window. As noted above, the MTC user interface 510 facilitates user-software interactions for performing MTC operations to simultaneously control and/or manipulate timing features, timing parameters, and/or times of focus for the HAs $414_1, \ldots, 414_N$. In step 720, the data for each displayed content 560, 562 is refreshed in accordance with the current MTC timing parameters. In effect, the displayed content 560 and 562 have the same times of focus (e.g., 2:30 PM on Dec. 12, 2007 to 2:30 PM on Dec. 13, 2007).

After completing steps 718, 720, the method 700 continues with step 722. In step 722, the times of focus for the displayed content 560, 562 are simultaneously moved backwards (or forwards) by a small step in time (e.g., five minutes). Step 722 can generally involve performing at least one user-action and software operations in response to the user-action. For example, if a user clicks on a small step backwards button 514 (or the small step forwards button 518) of the MTC user interface 510, then software operations are performed for moving the times of focus for the displayed content 560, 562 backwards (or forwards) by a pre-defined step in time. The software operations (i.e., calculations of new times of focus) are implemented by at least the MTC data object 412 and performed when the HAs $414_1, \ldots, 414_N$ are in their MTC modes. The software operations can generally involve a re-calculation of a start time value, a re-calculation of an end time value, a re-calculation of a current time value, and a communication of the re-calculated values to the MTC GUI objects $420_1, \ldots, 420_N$ and HAs $414_1, \ldots, 414_N$. The invention is not limited in this regard.

In step 724, the times of focus for the displayed content 560, 562 are simultaneously moved backwards (or forwards) by a large step in time (e.g., fifteen minutes). Step 724 can generally involve performing at least one user-action and software operations in response to the user-action. For example, if a user clicks on a large step backwards button 512 (or large step forwards button 520) of the MTC user interface 510, then software operations are performed for moving the times of focus for the displayed content 560, 562 backwards (or forwards) by a pre-defined step in time. The software operations (i.e., calculations of new times of focus) are implemented by at least the MTC data object 412 and performed when the HAs $414_1, \ldots, 414_N$ are in their MTC modes. The software operations can generally involve a re-calculation of a start time value, a re-calculation of an end time value, a re-calculation of a current time value, and a communication of the re-calculated values to the MTC GUI objects $420_1, \ldots, 420_N$ and the HAs $414_1, \ldots, 414_N$. The invention is not limited in this regard.

Upon completing step 724, the method 700 continues with a step 726 of FIG. 7C. In step 726, the data of the displayed content 560, 562 is simultaneously refreshed in accordance with predefined MTC timing parameters. Step 726 can generally involve performing at least one user action and software operations in response to the user-action. For example, if a user clicks on a refresh button 522 of the MTC user interface 510, then software operations are performed for refreshing the data of the displayed trends 560, 562. These software operations are implemented at least by the MTC data object 412 and performed when the HAs $414_1, \ldots, 414_N$ are in their MTC modes. The software operations can generally involve a re-calculation of a start time value, a re-calculation of an end time value, a re-calculation of a current time value, and a communication of the re-calculated values to the MTC GUI objects $420_1, \ldots, 420_N$ and the HAs $414_1, \ldots, 414_N$. The invention is not limited in this regard.

Thereafter, step 728 is performed. In step 728, at least one MTC timing parameter is changed. Step 728 can involve performing at least one user-action and software operations in response to the user-action. For example, if a user clicks on a parameter button 526 of the MTC user interface 510, then software operations are performed for displaying a time control properties (TCP) user interface 600 on the display screen 316 of the CPD $202_1, \ldots, 202_N$. After the TCP user interface 600 is displayed, the user selects a new value for at least one MTC timing parameter using at least one widget of the TCP user interface 600. Subsequently, the user clicks an "OK" button of the TCP interface 600. Thereafter, software operations are performed to store the new values in a memory 308 of the CPD $202_1, \ldots, 202_N$. Software operations for storing data are well known to those having ordinary skill in the art, and therefore will not be described herein. However, it should be understood that these software operations are implemented at least by the MTC data object 412. It should also be understood that the MTC data object 412 is generally updated with the new timing parameter value(s). Thereafter, the new timing parameter value(s) are generally transmitted to all objects subscribed to the MTC data object 412. In effect, data for the displayed content 560, 562 can be subsequently refreshed. The invention is not limited in this regard.

Upon completion of step 728, the method 700 continues with step 730. In step 730, the data for the displayed content 560, 562 are refreshed according to the new MTC timing parameter values. Step 730 can involve performing certain software operations implemented at least by the MTC data object 412 and are performed when the HAs $414_1, \ldots, 414_N$ are in their MTC modes. For example, the software operations can generally involve a re-calculation of a start time value, a recalculation of an end time value, a re-calculation of a current time value, and a communication of the recalculated values from the MTC data object 412 to the MTC GUI objects $420_1, \ldots, 420_N$ and the HAs $414_1, \ldots, 414_N$. The invention is not limited in this regard.

In step 732, the hairlines 596 are activated and displayed in each displayed trend 562. Thereafter, step 734 is performed where the hairlines 596 are simultaneously moved to a location of interest in the displayed trends 562. Step 732 can involve performing at least one user action and software operations in response to the user-action. For example, if a user moves a sliding bar 516 of the MTC user interface 510, then software operations are performed for moving the hairlines 596. The software operations are implemented at least by the MTC data object 412 and are performed when the HAs $414_1, \ldots, 414_N$ are in their MTC modes. The software operations can generally involve a re-calculation of a current time value by the MTC data object 412 and a communication of the re-calculated value from the MTC data object 412 to the HAs $414_1, \ldots, 414_N$. The invention is not limited in this regard.

It should be noted that if a hairline 596 or a sliding bar 516 is moved by a user, then a new value is sent from an MTC GUI object $420_1, \ldots, 420_N$ to the MTC data object 412. Thereafter, the MTC data object 412 sends the new value to the other MTC GUI objects $420_1, \ldots, 420_N$ and subsequently to the HAs $414_1, \ldots, 414_N$.

After the completion of step 734, the method 700 continues with a step 736 of FIG. 7D. Step 736 generally involves changing the modes of the HAs $414_1, \ldots, 414_N$ from their MTC modes to their LTC modes. Step 736 can involve a user-action of clicking a button 504 of the UPS user interface 320 and a software operation of individually or simultaneously changing the modes of the HAs from their MTC modes to their LTC modes.

As a result of the mode changes, steps 738 and 740 are performed. Step 738 involves hiding the MTC user interface 510 and/or displaying the LTC user interfaces 532 for each displayed content 560, 562. As noted above, the LTC user interfaces 532 facilitate user-software interactions for performing LTC operations to individually control and/or manipulate a time of focus for the respective displayed content 560, 562. Step 740 involves refreshing the data for the displayed content 560, 562 according to pre-defined LTC timing parameters or other specified parameters. Upon completing steps 738 and 740, step 742 is performed where the method 700 ends.

In light of the forgoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the all that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

I claim:

1. A method for providing master time control (MTC) services to a first historian application (HA) and a second HA, each said first and second HA configured to display content having a time of focus and a local time control (LTC) user interface when in an LTC mode, comprising the steps of:
changing a time control mode for said first and said second HA from said LTC mode to an MTC mode;
responsive to said changing said time control mode, synchronizing said times of focus for said first and second HAs to an MTC time of focus;
displaying first and second content, each comprising time-stamped historical data obtained during a period of elapsed time defined by said MTC time of focus;
wherein said LTC mode is a mode in which a local time control object is employed for manipulating said time of focus for any of said first and said second HAs, and said MTC mode is a mode in which a master time control object is employed for manipulating said times of focus for said first and said second HAs, and
displaying a first and second trend having respective first and second hairlines for conveying time-stamped historical data, simultaneously moving said first hairline from a first location within said first trend to a second location within said first trend and said second hairline from a first location within said second trend to a second location within said second trend, said second location within said second trend being the same as the second location within said first trend.

2. The method according to claim 1, further comprising the step of communicating LTC timing parameters defining an LTC time of focus from said first HA to said master time control object and setting said MTC time of focus equal to said LTC time of focus.

3. The method according to claim 2, further comprising the step of synchronizing said time of focus for said second HA to said LTC time of focus for said first HA using said set MTC time of focus.

4. The method according to claim 1, further comprising the steps of moving said MTC time of focus backwards or forwards by a pre-defined interval of time, and subsequent to said moving step, re-synchronizing said times of focus for said first and second HAs to said MTC time of focus.

5. The method according to claim 1, further comprising the steps of changing at least one MTC timing parameter and determining a new MTC time of focus using said at least one changed MTC timing parameter, wherein said at least one MTC timing parameter is selected from the group consisting of a start time parameter, an end time parameter, and a current time parameter.

6. The method according to claim 5, further comprising the step of re-synchronizing said times of focus for said first and second HAs to said new MTC time of focus and refreshing said time-stamped historical data of said first and second content, wherein said refreshed time-stamped historical data was obtained during a period of elapsed time defined by said new MTC time of focus.

7. The method according to claim 1, further comprising the steps of changing said time control mode of each said first and second HA from said MTC mode to said LTC mode, synchronizing said time of focus for each said first and second HA to a respective LTC time of focus, and refreshing said time-stamped historical data of said first and second content, wherein said refreshed time-stamped historical data was obtained during periods of elapsed time defined by said respective LTC times of focus.

8. A system, comprising:
a processing device configured for:
changing a time control mode of a first and second historian application (HA) from a local time control (LTC) mode to a master time control (MTC) mode,
synchronizing times of focus for said first and second HAs to an MTC time of focus,
displaying first and second content comprising time-stamped historical data obtained during a period of elapsed time defined by said MTC time of focus; and
wherein said LTC mode is a mode in which a local time control object is employed for manipulating said time of focus for any of said first and second HAs and said MTC mode is a mode in which a master time control object is employed for manipulating said times of focus for said first and second HAs,
wherein said processing device is further configured for displaying a first and second trend having respective first and second hairlines for conveying time-stamped historical data, moving said first hairline from a first location within said first trend to a second location within said first trend, and subsequent to moving said first hairline, moving said second hairline from a first location within said second trend to a second location within said second trend, said second location within said second trend being the same as the second location within said first trend.

9. The system according to claim 8, wherein said processing device is further configured for setting said MTC time of focus equal to an LTC time of focus for said first HA.

10. The system according to claim 9, wherein said processing device is further configured for synchronizing said time of focus for said second HA to said set MTC time of focus.

11. The system according to claim 8, wherein said processing device is further configured for moving said MTC time of focus backwards or forwards by a pre-defined interval of time, and synchronizing said times of focus for said first and second HAs to said moved MTC time of focus.

12. The system according to claim 8, wherein said processing device is further configured for changing at least one MTC timing parameter and determining a new MTC time of focus using said at least one changed MTC timing parameter, wherein said at least one MTC timing parameter is selected from the group consisting of a start time parameter, an end time parameter, and a current time parameter.

13. The system according to claim 12, wherein said processing device is further configured for synchronizing said times of focus for said first and second HAs to said new MTC time of focus and refreshing said time-stamped historical data of said first and second content, wherein said refreshed time-stamped historical data was obtained during a period of elapsed time defined by said new MTC time of focus.

14. A system, comprising:
a processing device configured for:
changing a time control mode of a first and second historian application (HA) from a local time control (LTC) mode to a master time control (MTC) mode,
synchronizing times of focus for said first and second HAs to an MTC time of focus,
displaying first and second content comprising time-stamped historical data obtained during a period of elapsed time defined by said MTC time of focus; and
wherein said LTC mode is a mode in which a local time control object is employed for manipulating said time of focus for any of said first and second HAs and said MTC mode is a mode in which a master time control object is employed for manipulating said times of focus for said first and second HAs,
wherein said processing device of further configured for displaying a first and second trend having respective first and second hairlines for conveying time-stamped historical data, simultaneously moving said first hairline from a first location within said first trend to a second location within said first trend and said second hairline from a first location within said second trend to a second location within said second trend, said second location within said second trend being the same as the second location within said first trend.

15. The system according to claim 8, wherein said processing device is further configured for changing said time control mode of each said first and second HA from said MTC mode to said LTC mode, synchronizing said time of focus for each said first and second HA to a respective LTC time of focus, and refreshing said time-stamped historical data of said first and second content, wherein said refreshed time-stamped historical data was obtained during periods of elapsed time defined by said respective LTC times of focus.

* * * * *